United States Patent
Normann et al.

(10) Patent No.: US 6,828,905 B2
(45) Date of Patent: Dec. 7, 2004

(54) SYSTEM FOR MONITORING AND FOR SIGNALING BY RADIO THE PRESSURE IN PNEUMATIC TIRES ON MOTOR VEHICLES

(76) Inventors: Norbert Normann, Panoramastrasse 12, D-75223, Niefern-Öschelbronn (DE); Andreas Kühnle, Hauptstrasse 25, D-75433, Maulbronn (DE); Gunter Lothar Schulze, Lutherstrasse 3, D-75228, Ispringen (DE); Ralf Kessler, Lessingstrasse 12, D-76327, Pfinztal (DE)

(*) Notice: Subject to any disclaimer, the term of this patent is extended or adjusted under 35 U.S.C. 154(b) by 0 days.

(21) Appl. No.: 10/081,827

(22) Filed: Feb. 22, 2002

(65) Prior Publication Data

US 2002/0113692 A1 Aug. 22, 2002

(30) Foreign Application Priority Data

Jul. 28, 2000 (WO) .............................. PCT/EP00/07340

(51) Int. Cl.⁷ .......................... B60C 23/02; B60C 23/00

(52) U.S. Cl. .................... 340/447; 340/442; 340/572.1; 340/572.7; 73/146.5

(58) Field of Search ................................ 340/442–448, 340/7.32, 7.33, 572.1–572.7, 10.33–10.34; 455/574; 73/146.5

(56) References Cited

U.S. PATENT DOCUMENTS

| | | | | |
|---|---|---|---|---|
| 5,883,305 A | * | 3/1999 | Jo et al. ..................... | 73/146.5 |
| 6,062,072 A | * | 5/2000 | Mock et al. ............... | 73/146.5 |
| 6,169,480 B1 | * | 1/2001 | Uhl et al. ................... | 340/442 |

* cited by examiner

Primary Examiner—Jeffery Hofsass
Assistant Examiner—Lam Pham

(57) ABSTRACT

A system for monitoring and signaling by radio a pressure or a change in pressure in pneumatic tires of wheels on vehicles consists of a receiver unit provided in or on the vehicle to which at least one antenna is associated, and of a unit, arranged in the pneumatic tire, for measuring, evaluating and transmitting tire pressure signals.

10 Claims, 2 Drawing Sheets

SYSTEM FOR MONITORING AND FOR SIGNALING BY RADIO THE PRESSURE IN PNEUMATIC TIRES ON MOTOR VEHICLES

BACKGROUND OF THE INVENTION

The present invention relates to a system having the features specified in the preamble of claim 1. A device of that kind is known from WO 93/08035. The device comprises a wheel-mounted electronic unit which is located within the pneumatic tyre and exposed to the pressure prevailing in the pneumatic tyre. The wheel-mounted electronic unit comprises a battery as current source, a pressure sensor for measuring the pressure prevailing in the pneumatic tyre, an electronic evaluation circuit for evaluating the measured-pressure signals supplied by the pressure sensor, and a sensor that is controlled by the evaluation circuit and by which signals containing information on the pressure in the tyre, derived from the measurement, are transmitted to a receiver unit. The pressure sensor is a semiconductor-based absolute-pressure sensor and supplies an electric output signal corresponding to the respective current tyre pressure. The receiver unit is a detached remote-control unit containing an interrogator by means of which the wheel-mounted electronic unit can be transferred from a current-saving state, in which a receiving means contained in the wheel-mounted electronic unit and an activation unit are kept in a standby state, into its normal operating state. The wheel-mounted electronic unit then measures the pressure and sends out a signal, containing information on the absolute pressure, to the remote control unit, which latter is provided with a liquid-crystal display from which the measured value can be read. A sequencing control takes care of the timely transmission of the pressure signal. The wheel-mounted electronic unit is then returned to its current-saving state, in which it consumes some microamperes of current. A lithium battery with the dimensions of a button cell, having a nominal voltage of approximately 3 V and a capacity of approximately 50 mAh, permits in this way the tyre pressure to be transmitted approximately 200 times only. If a service life of five years is to be achieved, then the pressure can be interrogated once a week only. This is absolutely insufficient, judging by the requirements of the automobile industry. On the one hand, it is desired for the battery to have a service life commensurate with the service life of the vehicle, because exchanging the battery in the wheel-mounted electronic unit is possible either not at all or only at high cost. On the other hand, effective monitoring of the tyre pressure is not possible with an interrogation frequency as low as once per week. A dangerous situation may arise for the driver when a sudden pressure loss occurs which can be detected only if the tyre pressure is measured at intervals of a few seconds. In order for this to be achieved, advanced tyre pressure monitoring systems do not transmit the tyre pressure every time it is measured, but transmit it only when a pressure deviation that may impair the driving safety becomes apparent or, from time to time, when the serviceability of the wheel-mounted electronic unit is internally checked and reported to the receiver unit. (DE 195 22 486 C2; the AMI DODUCO company publication entitled "Electronic tyre pressure control system. Higher driving safety—higher comfort"). This requires that the pressure be not only measured, but also evaluated in the wheel-mounted electronic unit, for which purpose the wheel-mounted electronic unit comprises an evaluation circuit that controls the transmitter of the tyre pressure electronics and causes it to transmit a signal only if necessary, namely when a relevant pressure deviation has been determined or when the serviceability of the wheel-mounted electronic unit is to be reported. AMI DOCUCO GmbH have succeeded in this way, by strictly optimising the operation of the battery-operated wheel-mounted electronic unit, to reduce the latter's current consumption so effectively that in the meantime the service life of a battery with a charging capacity of 300 mAh is at least seven years, although the wheel-mounted electronic unit measures the pressure every 3 s and transmits a signal every 54 s. The limited service life of the battery nevertheless remained a basic handicap of that tyre pressure monitoring system.

There have been plenty attempts to overcome the dependency of a tyre pressure monitoring system on the service life of a battery in the wheel-mounted electronic unit. There have been suggestions to equip the wheel-mounted electronic unit with mechanoelectric or thermoelectric transducers which would derive energy from the flexing work of the tyre during motion or from the heat developed during this process, convert such energy into electric current and use the latter to feed an accumulator for the operation of the wheel-mounted electronic unit. Such solutions are, however, too costly and do not offer the required reliability and service life under the rough operating conditions in driving operation.

Another suggestion proposes to supply the required energy to the wheel-mounted electronic unit from the outside, by means of a transponder. The current consumption of the wheel-mounted electronic unit is predominantly not due to measuring and transmitting processes, but to the pauses between the measuring processes when the wheel-mounted electronic unit must be kept in a standby state and when an internal clock operates. A tyre pressure monitoring system of this kind is described in the Internet by the SSI company; the website can be visited under. A transponder, or a responder, is a radio system that operates without a current supply of its own, transmits answering signals in response to interrogation signals received, and derives the energy required for this purpose from the very interrogation signals. In the case of the tyre pressure monitoring system, an interrogator, transmitting the interrogation signals, and a responder, receiving the answering signals transmitted by the transponder, are provided in the vehicle for this purpose. The tyre pressure monitoring system from SSI has the interrogator and the responder combined in one transmitter/receiver unit, which in the case of a vehicle with four wheels is connected to four antennas arranged in the wheel wells of the body close to the wheels. The interrogator sends out at regular time intervals an interrogation signal to a transponder included in the wheel-mounted electronic unit, and the transponder activates the wheel-mounted electronic unit, which contains neither a battery nor an accumulator, and transmits to it simultaneously the electric energy required by it to carry out a measuring operation and to transmit the measuring result back to the responder. It is a disadvantage of this system that the wheel-mounted electronic unit with the transponder is arranged, well-shielded, inside the wheel. The wheel rim, a steel belt in the tyre and fillers in the rubber of the tyre attenuate the signals transmitted by the interrogator and by the transponder so heavily that the antennas of the interrogator and of the responder must be arranged in close proximity to each wheel and the power of the interrogator must be sufficiently high to activate the wheel-mounted electronic unit and to make available, in addition, sufficient transmitting power for re-transmitting a tyre pressure signal. This makes that solution so expensive that it has not till now found acceptance in practice.

SUMMARY OF THE INVENTION

Now, it is the object of the present invention to open up a way of further increasing the service life of the battery in a battery-operated wheel-mounted electronic unit of a tyre pressure monitoring system without having to reduce the measuring rate for the tyre pressure.

This object is achieved by a system having the features set forth in claim 1. Advantageous further developments of the invention are the subject of the dependent Claims.

The invention combines a system of the known species, which is dependant on a battery, in a non-obvious manner with elements of the system that instead of using a battery works with a transponder, thereby achieving a result that utilises the advantages of the two oppositely directed technical concepts without, however, taking over their disadvantages. The receiver associated to the wheel-mounted electronic unit, which responds to the signals transmitted by the interrogator and which, preferably, is configured as a separate chip module, is not a complete transponder but utilises, essentially, only its receiver component; instead of the radio transmitter employed by a transponder, which is operated by the interrogation signals, the receiver only uses a trigger circuit that triggers and activates the battery-operated wheel-mounted electronic unit. The energy required for operation of the receiver is drawn by the receiver from the radio-frequency interrogation signal but, contrary to the known transponder solution, does not supply the remaining elements of the wheel-mounted electronic unit; rather it only generates trigger signals that activate the wheel-mounted electronic unit so that the latter is caused to perform one or more measuring and evaluation cycles and to transmit a radio signal to the receiver unit if this should be found necessary, based on the measuring results, the energy for the measuring, evaluation and signalling processes being drawn from the battery. After a certain period of time, which may be pre-set by suitably programming the wheel-mounted electronic unit, the electronic unit is deactivated again, unless it is caused to perform further measurements, based on the results of the evaluation of the pressure measurement, in order to verify a pressure drop observed and/or to observe its further development; such further measurements may be carried out according to the criteria, and in the manner disclosed by DE 195 22 486 C2 and the AMI DODUCO publication.

Contrary to a complete transponder solution, the receiver is only used to generate a trigger signal for activating the battery-operated wheel-mounted electronic unit. The energy, that is to be transmitted together with the interrogation signal, can therefore be much lower than the energy required to be supplied to the transponder according to the prior art, as known from SSI, in order to operate the entire wheel-mounted electronic unit and, in addition, to send the radio response signal, with the pressure information contained therein, to the receiver unit. This unusual, restricted use of elements of a transponder operating without a battery, in combination with a battery-operated wheel-mounted electronic unit, provides substantial advantages for the present special application in a tyre pressure monitoring system:

The current consumption of the wheel-mounted electronic unit, in its current-saving state, could be reduced to below 1 $\mu A$.

For transmitting the interrogation signals, it is no longer necessary to provide a separate antenna in the wheel well of each wheel. This cuts down considerably the cost of antennas and their installation. Since a separate antenna is no longer needed in each wheel well, it is no longer necessary to run a radio-frequency line into each wheel well. Rather, one or two antennas, which may be arranged in the middle of the vehicle, will be sufficient.

The interrogator may have a considerably lower rated power compared with that of a complete transponder solution (SSI), which helps reduce its cost considerably.

Since the receiver associated to the respective wheel-mounted electronic unit is now intended only to receive the interrogation signal and to convert it into a trigger signal, but is not required to make available the power for the operation of the wheel-mounted electronic unit and its transmitter, the receiver may have a lower power rating than one used in a complete transponder and may, therefore, be cheaper. Low-cost transponders are found today in great number in identification systems (access control) where identity cards are used in which a transponder in the form of a chip module with connected antenna is sealed, which is checked in no-contact fashion by a card reader that contains the interrogator and the responder. As the transponders used for this purpose are produced in large quantities, they are available at low cost. Their reach (distance between transponder and reader) is in the order of one meter and above. Considering, however, that according to the invention the response channel of the transponder is not used, an even greater range can be anticipated for such a transponder, if used in only one transmitting direction, namely from the interrogator to the receiving module of the transponder. Consequently, low-cost transponder modules of the kind employed in no-contact identification systems are also suited for use in connection with the present invention, although only their receiver module is required in this case, with the result that the chip module containing the receiver should also be cheaper compared with a complete transponder chip module.

The receiver associated to the wheel-mounted electronic unit draws no current from the battery of the wheel-mounted electronic unit. As usual with transponders, the receiver in fact does not require any electric current for being kept in a standby state for receiving an interrogation signal.

Given the fact that the wheel-mounted electronic unit is preceded by a receiving circuit which as such does not consume any current, there is no need, contrary to the case of WO/9308035, to keep the wheel-mounted electronic unit in a standby state, so that current consumption is reduced.

The wheel-mounted electronic unit must be kept in a standby state only insofar as it must be possible to activate it through a trigger signal transmitted from the receiver. When the wheel-mounted electronic unit comprises a volatile memory, the latter must be kept at a certain voltage to prevent data losses. This does not, however, result in considerable current consumption.

The internal clock of the wheel-mounted electronic unit, which in the case of the known solution as described by the AMI DODUCO publication and by DE 195 22 486 C2, had to be kept operating in the current-saving state of the wheel-mounted electronic unit in order to be able to activate it at predetermined time intervals, may be switched off in the case of the invention when the wheel-mounted electronic unit is in its current-saving state.

The interrogator can be switched off when the ignition is switched off or the car is locked, and can be switched on when the car is unlocked or the ignition system is switched on. In the inoperative condition of the vehicle, interrogation of the wheel-mounted electronic unit then does not take place, whereby current consumption is once more considerably reduced because most of the cars are in an inoperative state for more than 90% of their service life. Active operation of the wheel-mounted electronic unit is thus limited to the times in which the vehicle is operative. A safety-relevant pressure drop in a tyre, that may have occurred during the inoperative time, is nevertheless detected and signalled. This is achieved, preferably, by an arrangement where the interrogator is switched on simultaneously with the ignition system or when the vehicle is unlocked, whereupon the wheel-mounted electronic units are immediately interrogated and provided an opportunity to report any critical pressure deviation that may have occurred. In this way, the driver is informed of any critical pressure deviation, that may have occurred during the inoperative state of the vehicle, even before the vehicle starts moving. This is an essential safe-relevant aspect of the invention.

Given the fact that in the case of the invention the battery of the wheel-mounted electronic unit is spared very much more as compared with the prior art, it is no longer necessary, when rating the wheel-mounted electronic unit, to pay the same extreme attention to current-saving as necessary heretofore, with a view to achieving long service life of the battery. The circuitry input and the software input for the wheel-mounted electronic unit can therefore be reduced relative to the prior art.

Instead of increasing the service life of the battery, the invention also provides the possibility of reducing the size of the battery and, thus, its cost.

The system according to the invention can be operated so that each interrogation is followed, in the wheel-mounted electronic unit, by a single measuring and evaluation process and, if necessary, transmission of a radio signal. This may take place at intervals of a few seconds. Preferably, however, the system is operated in such a way that after receipt of an interrogation signal, the wheel-mounted electronic unit will not perform a single pressure measurement only, but repeat the pressure measurement and evaluation at regular intervals of a few seconds over a longer period of time of, for example, some minutes and will then automatically return to its current-saving state, as provided for by the programming of the wheel-mounted electronic unit. For example, an interrogation signal could be sent every five minutes to activate the wheel-mounted electronic unit for an active phase somewhat shorter than five minutes. This would ensure that on the one hand the tyre pressure would be continuously monitored in driving operation and that, on the other hand, when the vehicle has been stopped, the wheel-mounted electronic unit would in any case return to its current-saving state at the end of a certain after-running period, and remain in that state until the vehicle is unlocked again and/or the ignition is switched on again.

The radio signals transmitted by the wheel-mounted electronic unit contain several parts in digital form, namely a preamble, the identifier, a tyre pressure signal and a postamble. The radio signals are radio-frequency signals. Radio-frequency transmission is effected in Germany, preferably, in the 433 MHz range, known as ISM band, in certain other countries in the 315 MHz range or the 868 MHz range. The radio signals transmitted by the wheel-mounted electronic units are received by the receiving antennas provided for this purpose.

If a separate receiving antenna is associated to each wheel antenna, the antenna is preferably located in the neighbourhood of the respective wheel, especially on the wall of the wheel well of the vehicle body. There is also the possibility to provide a common first antenna for the front wheels and a common second antenna for the rear wheels, in which case the antennas are preferably arranged approximately midway between the wheels. The receiving antennas transmit the RF signals via special RF lines to the central receiving, evaluation and control unit where a RF receiver, provided with a separate receiving channel for each antenna, amplifies and demodulates the signal received at the input of the respective channel. The low-frequency signal present after demodulation is decoded and evaluated in order to let the driver have a warning, if necessary, or some other information regarding tyre pressure, via the control module of the unit.

The radio signals are weak, with a view to saving current. Due to the low signal level on the electric lines between the receiving antennas and the central receiving, evaluation and control unit, complex measures are required for the electric lines to protect the transmitted signals from external interfering influences. In the case of a practical embodiment of a tyre pressure monitoring system according to DE 195 18 806 A1, the electric lines are costly shielded twisted-pair cables.

According to a further development of the invention, it is therefore preferably provided to associate to each receiving antenna a single-channel RF receiver with demodulator so that the electric lines transmit LF signals instead of RF signals. The LF signals do not require costly shielded cables for their transmission; instead unshielded electric lines may be used which are much less costly. And there is also the advantage that the LF signals formed directly at the antenna are much less susceptible to interference than the RF signals transmitted via twisted-pair cables according to the invention. More details in this respect are disclosed in DE 19 56 898 A1 to which reference is expressly made. Preferably, the receiving antennas of the receiver unit are simultaneously used as transmitting antennas of the interrogator. Advantageously, each antenna may be combined with an interrogator of its own, so that there is no need to run an RF line for interrogation purposes.

The period of time, for which the wheel-mounted electronic unit remains active after having been triggered, not only can be firmly predetermined by suitable programming, but can be selected to be variable in response to one or more physical states, which are variable in driving operation and which are measured in the tyre. Such a state may, for example, be the speed of the vehicle which may be determined by a centrifugal sensor additionally provided in the wheel-mounted electronic unit. During low-risk driving states (slow motion and stopped condition) the time intervals at which the wheel-mounted electronic unit sends out radio signals may be much longer than during high-speed conditions. The measuring rate and the transmitting rate may also be selected to be variable in response to the measured pressure or its variation over time, the rule being that the pressure is measured, and signals are transmitted at higher frequency when the pressure drop rises and develops more quickly. This means on the other hand that in the presence of normal pressure and during a merely slow pressure change the measuring and transmission rates can be extended compared with the prior art. This on the one hand helps save current and permits the frequency of the interrogation signals to be reduced as well. More details about how the measuring and transmission rate can be varied in response to one or more physical states, that vary in driving operation and that are measured in the tyre, are disclosed by DE 198 56 860 A1, to which reference is expressly made.

Generally, the transmission power of the interrogator and of the wheel-mounted electronic unit are sufficient to cover the needs of the four wheels of a vehicle using a common central antenna for radio transmission of the interrogation signals and for receiving the pressure signals. However, there may be the further requirement, as a marginal condition, that the receiver unit be capable of detecting, from the signals emitted by the wheel-mounted electronic units, the actual location in the vehicle of the wheel from which a signal has been received. DE 198 56 861 A1 discloses ways of deriving clear conclusions regarding the wheel position with the aid of acceleration sensors in the wheel-mounted electronic units even in cases where instead of having a separate antenna arranged in each wheel well, next to each wheel, only two antennas, or even a single antenna is provided.

Different operating conditions in which the system according to the invention may assume its active state have been disclosed in DE 195 22 486 C2 and will be described hereafter once more:

1. Original State

Tyre pressure is at its nominal value $p_o$, and is constant. This is the condition prevailing at the start of motion and when the vehicle moves at slow speed. The tyre pressure is measured, and compared with the preceding measured value, at regular intervals $t_o$. So long as no variation between the two values is detected, no data need to be transmitted from the wheel-mounted electronic unit to the receiver unit. Even small differences between the two pressure values, due for example to the acquisition of the measured values or temperature changes, do not lead to the transmission of data to the receiver unit as long as the differences do not exceed a threshold value $?p_0$. The pressure value last measured is stored instead of the value measured before, in order to be compared with the next measured value. Instead of the pressure value measured last, it is also possible to use the mean value of several pressure values measured before, for comparison with the current pressure value.

Irrespective of whether the threshold value has been exceeded or not, a complete data telegram, containing the current pressure value, is transmitted by the transmitter in the wheel-mounted electronic unit to the receiver unit at regular time intervals $T_0 > t_0$. Such transmission, effected at regular greater time intervals, serves system monitoring purposes and makes it possible to determine the development of a possible gradual drift of the tyre pressure.

Typical numerical values are:
$t_0$: 1 to 10 seconds;
$T_0$: 0.5 to 60 minutes;
$?p_0$: 10 to 100 mbar ($10^3$ to $10^4$ N/m$^2$)

2. Motion without Pressure Drop

At the start of motion, the tyre pressure has the initial value $p_0$. The normal flexion encountered during motion has the effect to heat up the tyre and, thus, the air in the tyre, a lesser or higher degree, depending on the speed. This causes the pressure in the tyre to rise so that the current tyre pressure comes to exceed the initial pressure $p_0$ and to vary in response to the driving speed and the properties of the road. The resulting variation of the tyre pressure develops so slowly that the pressure variation does not reach the threshold value $?p_0$ in the time intervals $t_0$ so that the transmitter will not be activated. Nevertheless, information regarding the pressure prevailing in the tyre is transmitted to the receiver unit at the time intervals $T_0$, together with the data telegram which also serves system-monitoring functions.

The information regarding the absolute tyre pressure contained in the data telegram is used by a processor provided in the receiver unit to detect and evaluate slow pressure variations in all tyres of the vehicle, especially in the tyres on a common axis, and to thereby identify pressure variations resulting from normal flexion work.

3. Motion with Slow Pressure Drop

Slow pressure drop is determined in the same way as slow pressure changes during motion without pressure drop. A slow pressure drop is identified by the processor in the receiver unit based on the absolute pressure values and on a comparison between the measured pressure values of the different tyres.

4. Rapid Pressure Drop

In the case of a rapid pressure drop, caused by damage to the tyre or to the valve, the pressure drift becomes so considerable that the pressure change between the comparison pressure signal formed last and the current pressure signal comes to exceed the predetermined threshold value. In this case, a signal indicative of the pressure drop could be transmitted to the receiver unit immediately. However, in order to exclude any accidental faulty measurement, a signal, preferably, is not sent to the receiver unit immediately after the threshold value has been exceeded; rather, the measuring rate is first increased, i.e. the time intervals are reduced for a predetermined number of measurements from $t_0$ to $t_1 < t_0$, especially to values of $t_1$ of between 1 to 100 milliseconds. If the fact that the threshold value has been exceeded is confirmed by the next measurements, preferably by the next two to ten measurements, then the transmitter is activated and the pressure signal is transmitted to the receiver unit. Regarding the measurements performed at the higher rate it must of course be considered that the threshold value must be correspondingly reduced for the shorter time intervals, for the same speed of pressure drop. In view of the limited sensitivity of the pressure sensor, this will, generally, not be possible to the extent necessary. It is therefore preferable in this case to continue to use as comparison pressure signal the comparison pressure signal formed last before the time interval was reduced from $t_0$ to $t_1$ until the predetermined number of measurements with the higher measuring rate is completed or the measuring rate has been extended again to its original value (time interval $t_0$).

A different solution is the possibility to send a pressure signal at a higher measuring rate (time interval $t_1$) every time the measured pressure value has changed by a given amount, for example by 10 to 100 mbar. If a further pressure change is no longer detected (pressure change smaller than the threshold value $?p_0$), then either measurements are continued for a certain time at the higher measuring rate (time interval $t_1$), or a predetermined further number of measured values are picked up at the higher measuring rate (time interval $t_1$), whereafter the system is returned to the original lower measuring rate (time interval $t_0$).

The system may be switched back to the lower measuring rate also when the measured pressure value exceeds a predetermined maximum value of, for example, 5 bar or drops below a predetermined minimum value of, for example, 1 bar. When the measured pressure values drop or rise significantly, the system is then again switched to the higher measuring rate.

5. Filling Operation

During filling, the pressure varies so rapidly that the threshold value (between 10 and 100 mbar) is regularly exceeded at the normal measuring rate (time intervals $t_0$ between 1 and 10 seconds). It is, therefore, possible to proceed in the same way as in the case of rapid pressure losses. However, as generally the filling operation is not critical, there is also the possibility to transmit a pressure measuring signal only after the tyre pressure has stabilised again, which indicates that filling has been completed.

6. Theft Control

If the central receiver unit is not completely switched off in times when the vehicle is stationary, but is switched off only at intervals or is switched over to a lower interrogation rate of, for example, one interrogation cycle in 5 to 10 minutes, then the tyre pressure monitoring system can be used also for monitoring the vehicle wheels as an anti-theft measure. The wheel-mounted electronic units will then from time to time send out a data telegram, containing information on the vehicle state, to the central receiver unit in the vehicle also in the stationary condition of the vehicle. When a wheel is stolen, no data telegram is received, and this is discovered by the evaluation circuit in the central evaluation unit and may be answered by an alarm.

Since the wheel-mounted electronic unit is intended for measuring the pressure in the tyre, it is arranged in the tyre. This can be achieved by positioning it on the valve base, as described in WO 93/08035. Or else it may be arranged in the area of the wheel rim enclosed by the tyre. Where wheels are provided with a plastic ring, intended for stabilising the tyre in an emergency situation after a pressure drop and arranged in the air chamber of the tyre for the purpose of maintaining emergency running conditions when mounted on the rim, the wheel-mounted electronic unit may be arranged also in a recess of that plastic ring.

BRIEF DESCRIPTION OF DRAWINGS

One embodiment of the invention is shown diagrammatically in the attached drawings, in which.

DETAILED DESCRIPTION OF THE INVENTION

Figure 1:
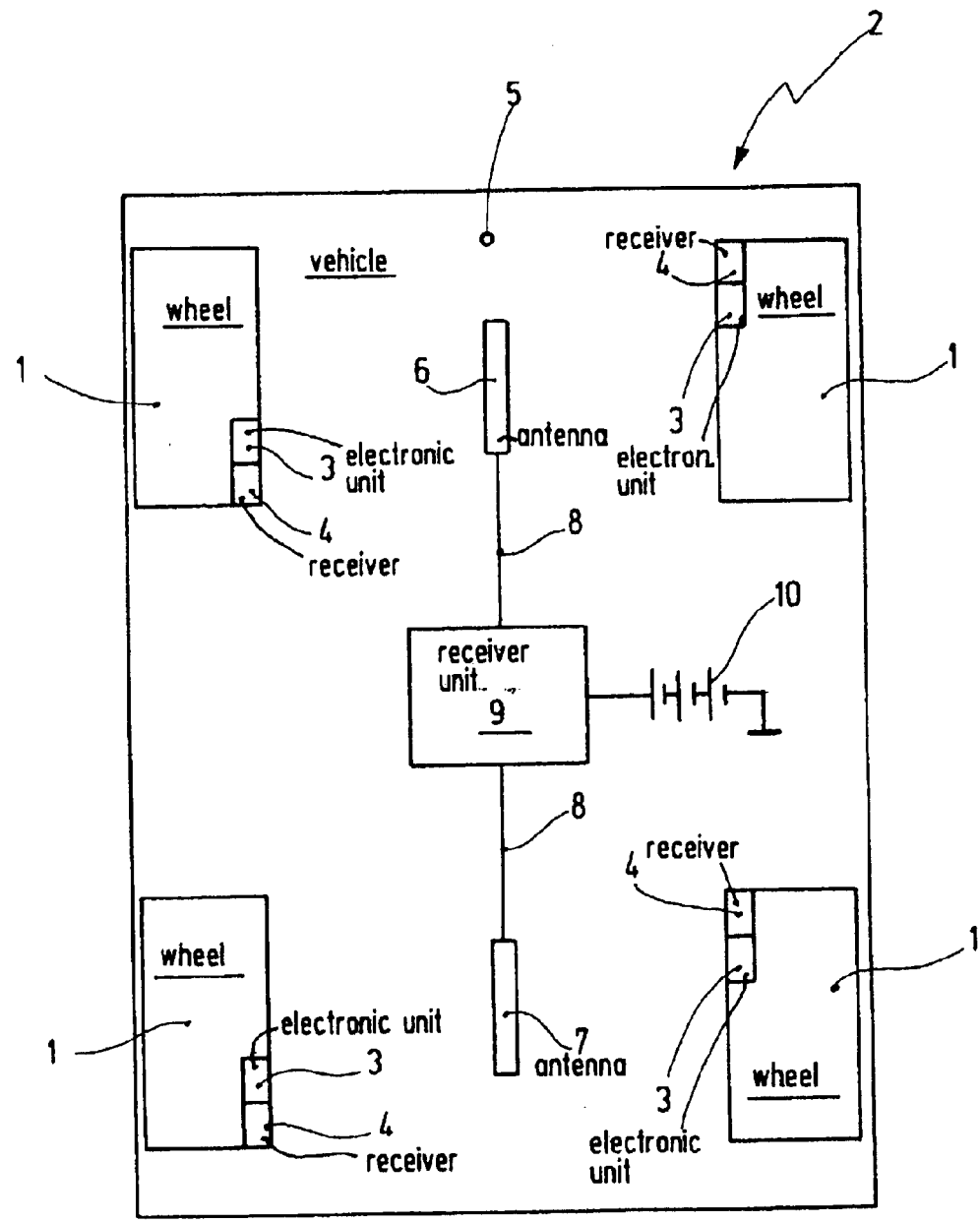
FIG. 1 shows a block diagram of the arrangement of the essential components of a tyre pressure monitoring system in a motor vehicle.

FIG. 1 shows four wheels 1 of a motor vehicle 2, in diagrammatic representation. Each wheel 1 is provided with a wheel-mounted electronic unit 3 with integrated receiver 4, which is mounted inside the pneumatic tyre of the wheel 1 either on the rim or on a valve base or—if the respective wheel is a wheel with emergency-running properties—in a recess in a plastic ring that encloses the wheel rim. The wheel-mounted electronic units 3 and the receivers 4 are identical one to the other and are mounted in the same positions relative to the respective wheel 1. Mounted under the floor 5 of the vehicle body are two antennas 6 and 7, arranged in the area of the longitudinal centre line of the vehicle. The one antenna 6 is positioned between the front wheels, the other antenna 7 between the rear wheels. The two antennas 6 and 7 are connected via a radio-frequency line 8, for example a coaxial line, with a receiver unit 9 arranged in the body, which is supplied with current from the vehicle battery 10.

Figure 2:
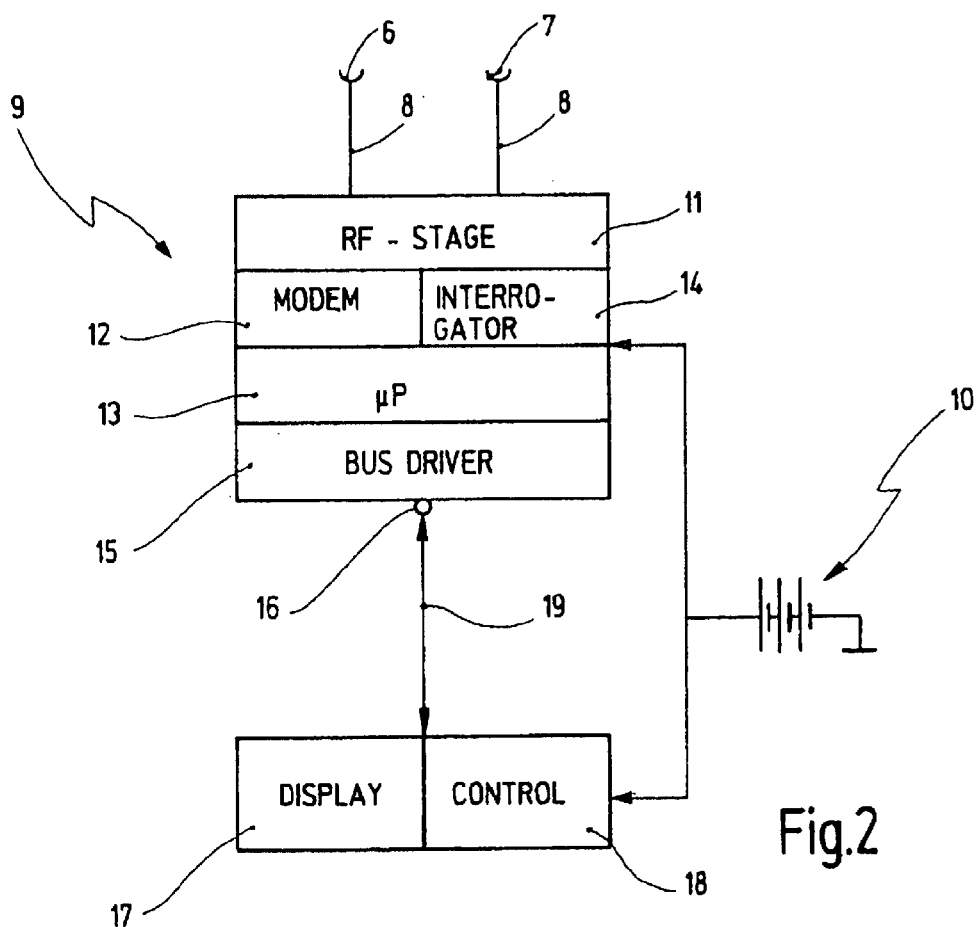
FIG. 2 shows a block diagram of a receiver unit provided in the vehicle.

As is seen in the block diagram of FIG. 2, the receiver unit 9 comprises, as essential components, a radio-frequency stage 11 with two channels, corresponding to the number of antennas 6 and 7, a modulator/demodulator 12, a microprocessor 13 for evaluating the signals and for control functions, an interrogator 14, a bus driver 15 for a bus interface 16 and, mounted on the instrument panel, a display 17 combined with a manual control 18, which is connected to the microprocessor 13 via a bidirectional bus 19. The voltage supply for all these components is provided by the electric system of the vehicle, represented in the drawing by the connection between the two parts of the receiver unit 9 and the vehicle battery 10.

Figure 3:
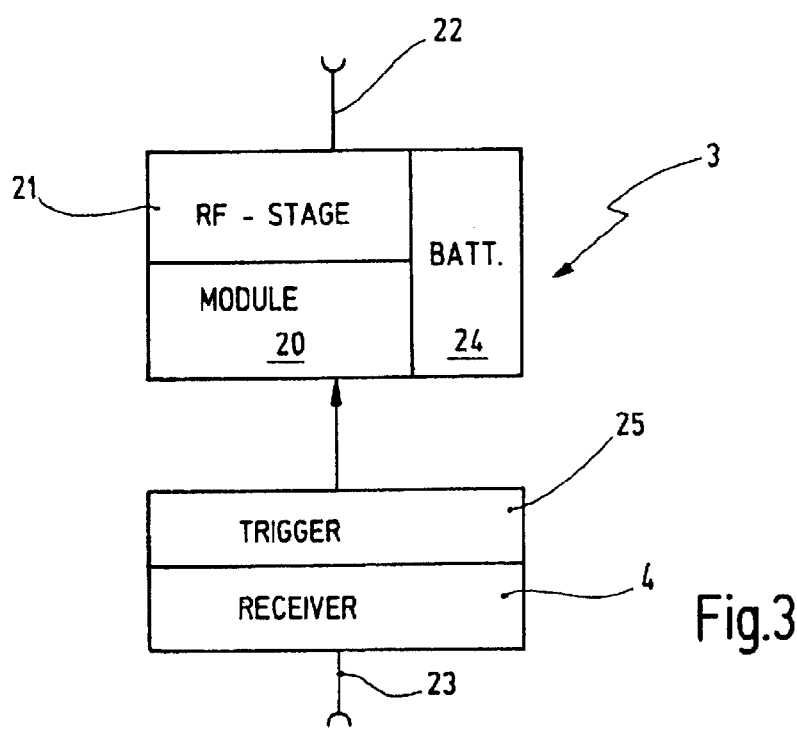
FIG. 3 shows a block diagram of a wheel-mounted electronic unit in combination with a receiver.

According to the block diagram of FIG. 3, the wheel-mounted electronic unit 3 comprises a module 20, containing an integrated pressure and temperature sensor with associated measuring, evaluation and control circuit, an RF stage 21, a radio antenna 22 and an electric battery 24 supplying the current for the module 20 and the RF stage 21. The RF stage 21 feeds the radio antenna 22. The pressure sensor in the module 20 is, preferably, a sensor operating on a piezoelectric basis.

A receiver 4 with a receiving antenna 23 is associated to the wheel-mounted electronic unit 3. The receiver 4 functions like the receiver unit of a transponder and does not, therefore, need to be supplied with current from the battery 24. At the output of the receiver 4, there is provided a trigger circuit 25 connected to the trigger input of the module 20.

The invention as illustrated in FIGS. 1 to 3 operates as follows:

The wheel-mounted electronic unit 3 remains, for most of the time, in a current-saving state in which its functions are largely switched off and in which it only needs a current of less than 1 $\mu$A in order to be ready to receive a trigger signal arriving from the trigger circuit 25 and to save any data that may have been stored in a volatile memory.

When the vehicle is unlocked and/or its ignition is switched on, the receiver unit 9 and, together with it, the interrogator 14 are switched on as well, and the interrogator generates an interrogation signal at time intervals $t_0$ of, for example, 5 minutes and sends out that signal via the modulator/demodulator 12, the RF stage 11 and the antennas 6 and 7. The interrogation signal is received by the local receiving antenna 23 at each of the wheels 1 and activates the receiver 4 with the energy transmitted by the interrogation signal so that the receiver is caused to output a trigger signal via the trigger circuit 25 to the module 20. Thereupon, the latter is switched over to its normal operating state and is kept in this state for a predetermined period of time $T_1 < T_0$ during which an internal clock is active in the module 20. Conveniently, $T_1$ is only a little shorter than $T_0$. In that normal operating state, temperature and pressure measurements are carried out at predetermined time intervals $t_0$ of, for example a few seconds. The measurements are evaluated. Only if the evaluation indicates that a warning signal should be transmitted, or if a standby signal is transmitted that signals the receiver unit, for example, at the regular time intervals $t_0$ that the wheel-mounted electronic unit operates properly, will the modulator 20 cause the RF stage 22 to output a digital RF signal which contains information on the pressure measured and/or the pressure change measured, if any, and which contains in addition an identifier characteristic of the respective wheel-mounted electronic unit, from which the receiver unit 9 is capable of deriving a conclusion regarding the position of the wheel 1 where the signal has been emitted.

The signal emitted by the radio antenna 22 is received mainly by the one of the two antennas 6 and 7 which is located the closest, is then supplied to the receiver unit 9 via line 8, enters the two-channel RF stage 11, is demodulated by the modulator/demodulator 12 and processed by the microprocessor 13. The microprocessor 13 controls the bus driver 15, which thereupon transmits an indication signal generated by the microprocessor 13 to the display unit 17 where the signal is displayed on a liquid-crystal display, for example.

The wheel-mounted electronic unit 3 repeats the measurements at the predefined time intervals $t_0$ until it is switched off again by its internal clock. Between the individual measurements, it assumes a current-saving state in which its internal clock continues, however, to run and to consume current. At the end of a period of time $T_1$ of some minutes, which has been started by an interrogation signal, the internal clock is also switched off and the wheel-mounted electronic unit returns, according to the invention, to its extreme current-saving state from which it is activated only by the arrival of the next interrogation signal.

The operation of the receiver unit 9 can be varied via a manual control 18 arranged in the instrument panel.

The receiver 4 may, essentially, consist of a chip module of the kind used for transponders, with the exception that a reverse channel provided in transponders for returning a response signal is not required in this case.

Suitable transponders, the chip modules of which are generally suited for use, are available from AmaTech Electronic Components Manufacturing GmbH, Rossbergweg 2, 87459 Pfronten; they are offered by AmaTech for no-contact identification systems, especially for integration in identity cards in cheque card format.

What is claimed is:

1. System for monitoring and signalling by radio a pressure or a change in pressure in pneumatic tyres of wheels (1) on vehicles (2), consisting of a receiver unit (9) provided in or on the vehicle (1) to which at least one antenna (6, 7), is associated, and of a electronic unit (3), arranged in the pneumatic tyre, for measuring, evaluating and transmitting tyre pressure signals, hereinafter referred to as "wheel-mounted electronic unit", comprising a battery (24) as current source, a pressure sensor for picking up the pressure prevailing in the pneumatic tyre, an evaluation circuit for evaluating the measured pressure signals supplied by the pressure sensor, and a transmitter (21) which is controlled by the evaluation circuit and which transmits to the receiver unit (9) signals that contain information regarding the pressure in the tyre and/or the condition of the wheel-mounted electronic unit (3), the wheel-mounted electronic unit (3) being activated at time intervals ($t_0$) for a period of time ($T_1$) shorter than the time intervals ($t_0$) and remaining otherwise in a current-saving state, characterised in that an interrogator (14) is provided on the vehicle (1) and that there is associated to the wheel-mounted electronic unit (3) on the same wheel (1) a receiver (4) which is responsive to interrogation signals sent out by the interrogator (14) and which draws the energy required for its function not from the battery (24) but from the interrogation signals as such, and that the receiver (4) has a trigger circuit (25) the output of which is connected to a trigger input of the wheel-mounted electronic unit (3) so that the latter is activated by triggering and returns to its current-saving state at the end of the before-mentioned period of time ($T_1$).

2. The system as defined in claim 1, where the current-saving state of the wheel-mounted electronic unit (3) is characterised in that it is kept in a responsive state only for the reception of the trigger signal and is kept under voltage, if necessary, only for saving data in a volatile memory, its internal clock being switched off in that state.

3. The system as defined in claim 1, characterized in that the interrogator (14) and the receiver unit (9) are connected with the locking system or the ignition lock of the vehicle (2) in such a way that the interrogator (14) and the receiver unit (9) are switched off when the ignition is switched off or when the vehicle (2) is locked, and are switched on when the ignition key is operated, the ignition is switched on or the vehicle (2) is unlocked.

4. The system as defined in claim 1, characterized in that the wheel-mounted electronic unit (3) is adjusted so as to ensure that once an interrogation signal is received by it, it performs consecutively a plurality of measurements and evaluation cycles during its active period of time ($T_1$) commencing at that moment.

5. The system as defined in claim 4, characterised in that measurements are carried out at intervals ($t_0$) of 2 s to 4 s.

6. The system as defined in claim 4, characterised in that the active period of time ($T_1$) is 0.5 min. to 10 min., preferably 3 min. to 5 min.

7. The system as defined in claim 1, characterized in that a single-channel RF receiver with a modulator is arranged near each antenna (6, 7) of the receiver unit (9) and that lines (8), leading from these antennas (6, 7) to the receiver unit (9), carry LF signals rather than RF signals.

8. The system as defined in claim 7, characterised in that an interrogator (14) is arranged near each antenna (6, 7) associated to the receiver unit (9).

9. The system as defined in claim 1, characterized in that the wheel-mounted electronic unit (3) comprises a centrifugal sensor, with the aid of which the measuring rate and the transmitting rate of the wheel-mounted electronic unit (3) can be varied.

10. The system as defined in claim 1, characterized in that the measuring and/or transmitting rate of the wheel-mounted electronic unit (3) can be varied by an evaluation and control circuit provided in the wheel-mounted electronic unit, in response to the pressure and/or the variation of the pressure occurring over time.

* * * * *